United States Patent Office 3,459,282
Patented Aug. 5, 1969

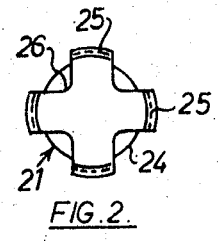
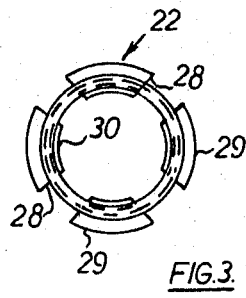
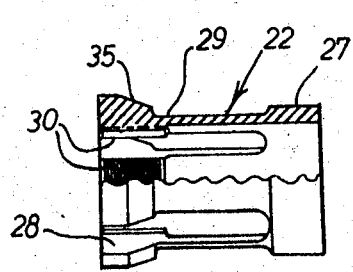
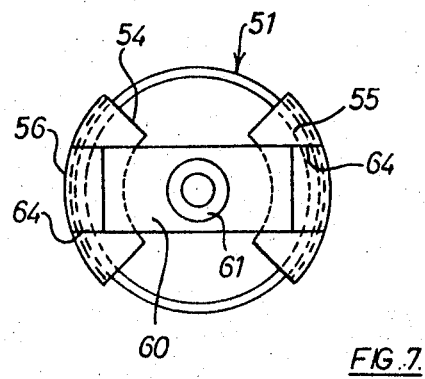
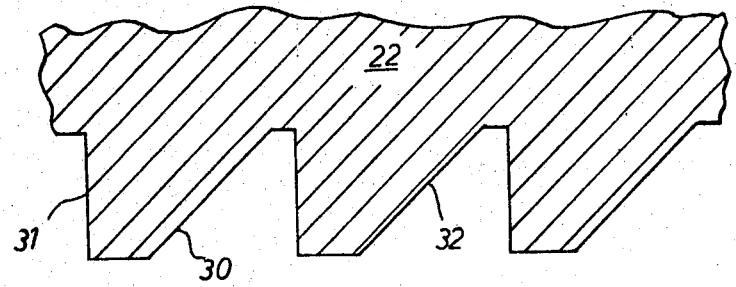

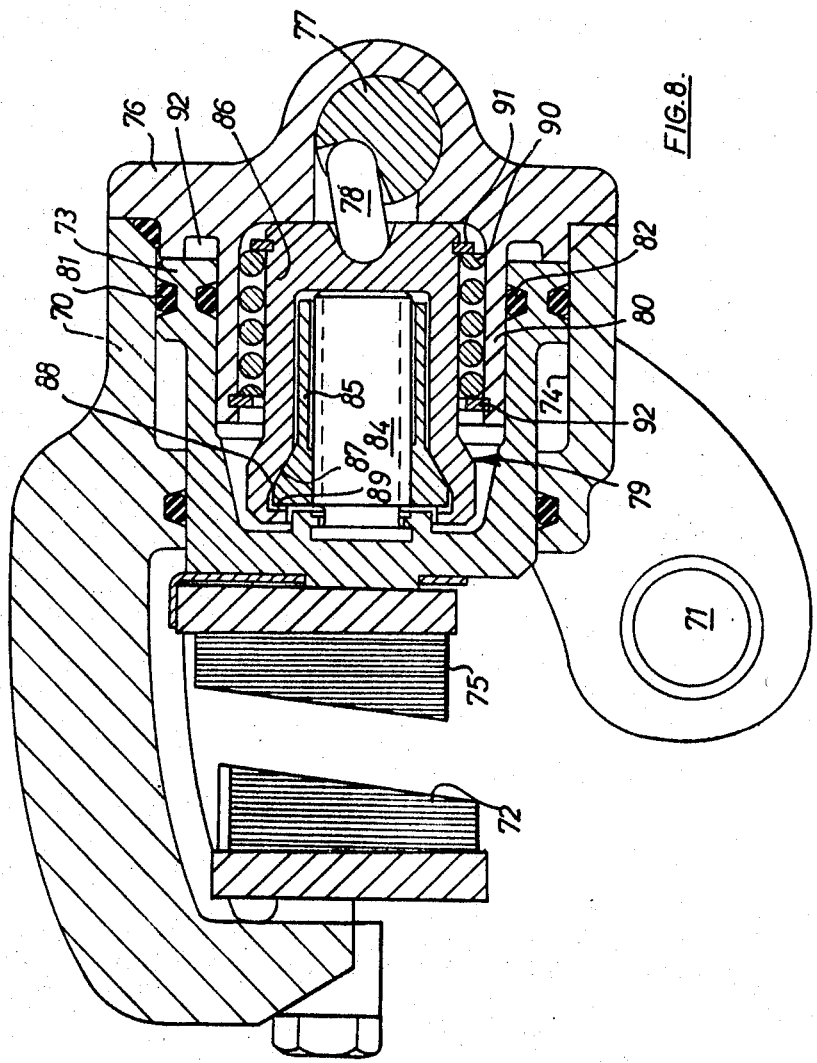

3,459,282
AUTOMATIC ADJUSTERS FOR VEHICLE BRAKES
Hermann Hans Hoenick, Immendorf, and Hans Albert
Beller, Koblenz-Asterstein, Germany, assignors to
Girling Limited, Birmingham, England
Filed Mar. 15, 1967, Ser. No. 650,143
Claims priority, application Great Britain, Mar. 15, 1966,
11,208/66
Int. Cl. F16d 65/14, 55/00, 65/38
(Filed under Rule 47(a) and 35 U.S.C. 116)
U.S. Cl. 188—106                                    14 Claims

ABSTRACT OF THE DISCLOSURE

An automatic adjuster for a hydraulic brake actuator comprises a linear ratchet mechanism operative between a piston of the actuator and a cam (auxiliary mechanical actuator) journalled in a second piston opposed to the first-mentioned piston or in a cylinder body in which the piston is slidable. The ratchet mechanism includes a thrust member which is acted upon by the cam and which acts on pawls of the ratchet mechanism through a conical surface so that when the cam is turned to apply the brake mechanically, the pawls are urged positively into engagement with the ratchet teeth. An abutment on the thrust member acts on the pawls in the opposite direction to step the ratchet mechanism automatically when excessive travel takes place between the two pistons or between the piston and the cylinder in the event of pad wear.

---

The present invention relates to an automatic adjuster for a hydraulic actuator for a vehicle brake, such as a spot-type disc brake, the hydraulic actuator including a piston and a counter-member (such as a cylinder or a second piston) opposed to the first-mentioned piston, an auxiliary mechanical actuator (such as a hand brake) being fitted in the counter-member. When pressure is applied to the hydraulic actuator, the hydraulic fluid urges the piston and the counter-member apart to apply the brake.

An object of the invention is to provide means to prevent the piston and its counter-member moving too far towards one another when the brake pressure is released as otherwise excessive pedal travel would be required next time the brake is applied.

Another object of the invention is to provide an adjustable length mechanism between the piston and the auxiliary mechanical actuator, the adjustable length mechanism being capable of withstanding the full brake applying thrust which can be achieved by the mechanical actuator.

A further object of the invention is to provide an adjustable length mechanism which is automatically adjustable when brake pad wear has taken place.

Accordingly the present invention provides an automatic adjuster for a hydraulic actuator for a vehicle brake comprising a linear ratchet mechanism of adjustable length, operative between a piston of the actuator and an auxiliary mechanical actuator fitted in a counter-member of the hydraulic actuator opposed to said piston, means for stepping the ratchet mechanism responsively to excess travel between said piston and said counter-member opposed thereto, and means for positively holding the ratchet mechanism in engagement when the ratchet mechanism is under load to prevent risk of slipping of the ratchet mechanism.

Figure 1:
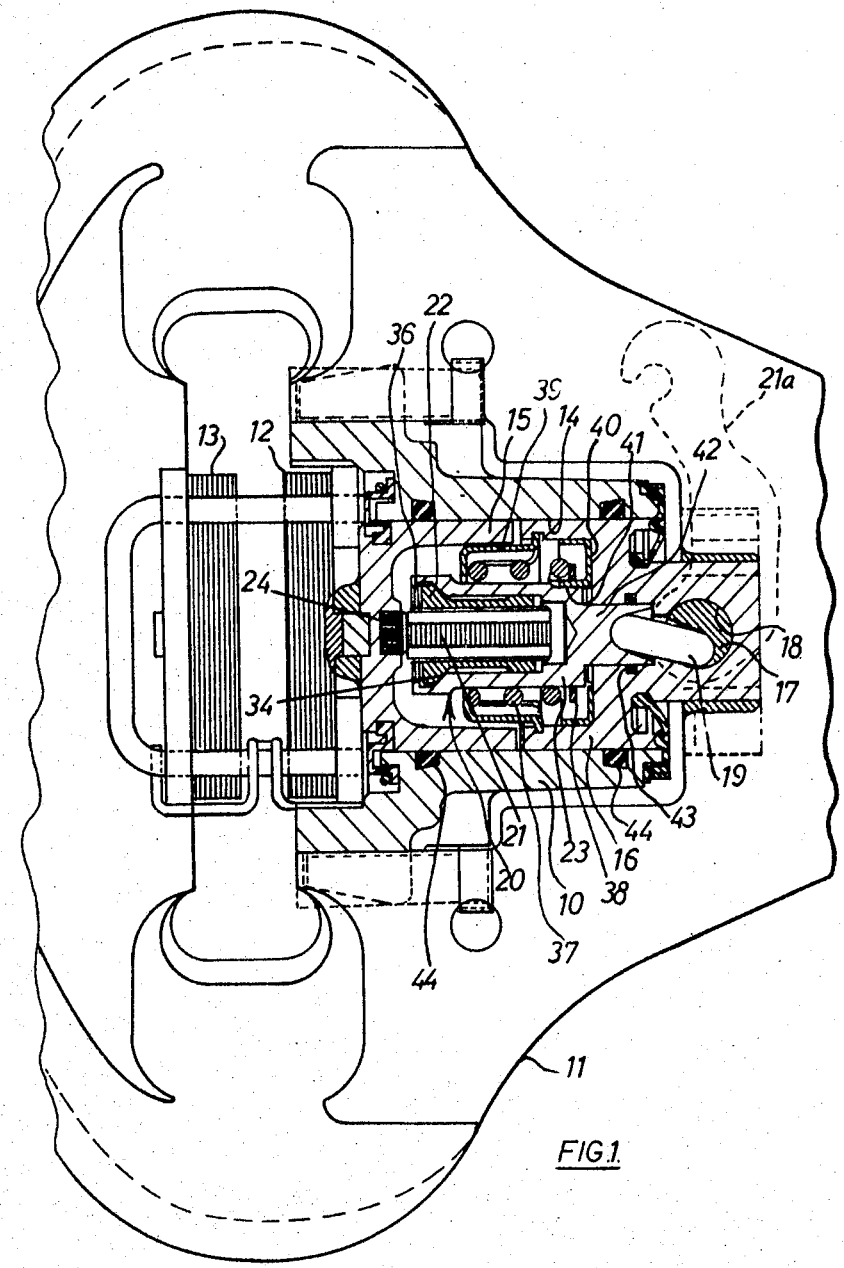
Figure 6:
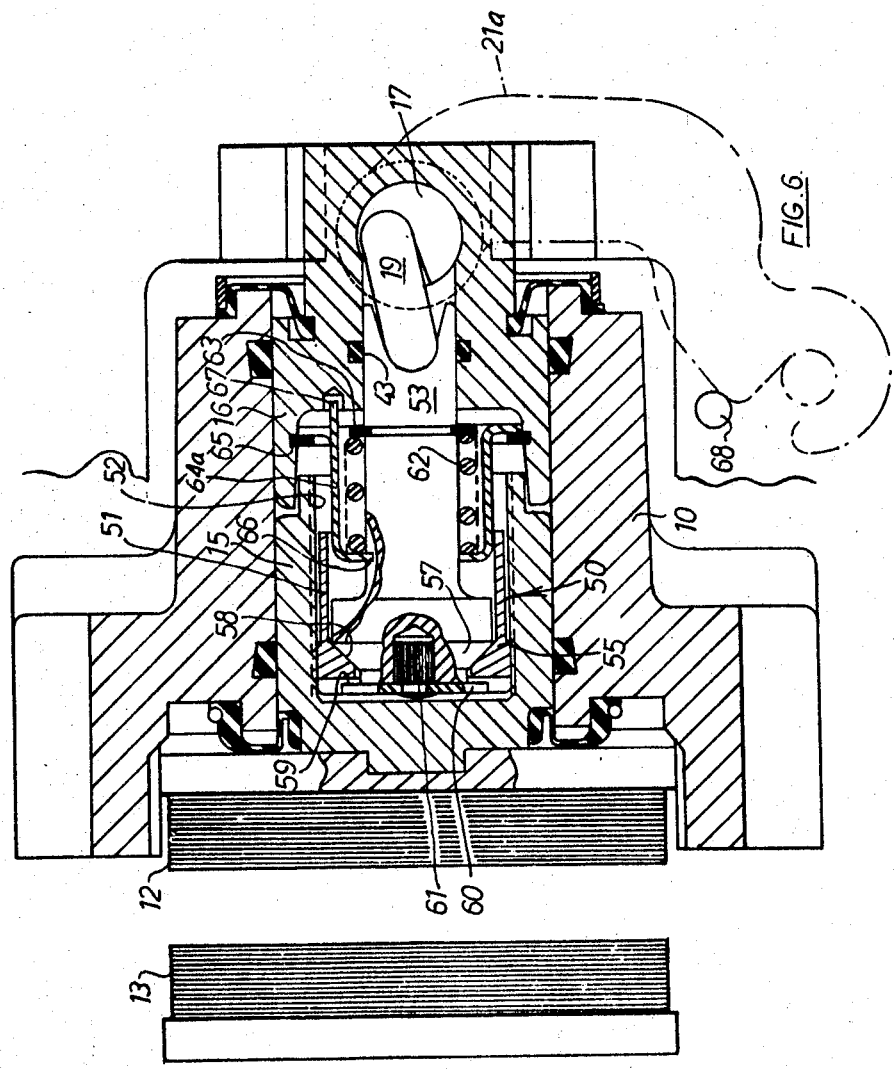

The invention is further described, by way of example, with reference to the accompanying drawings, in which:

FIG. 1 is a sectional plan view of one embodiment of automatic adjuster constructed in accordance with the invention for a hydraulic actuator of a disc brake, FIG. 2 is an end view of one component of a mechanism of adjustable length of the actuator of FIG. 1, FIG. 3 is a similar view of another component of the mechanism of adjustable length, FIG. 4 is a partly sectioned side view of the component of FIG. 3, FIG. 5 is a very much enlarged sectional detail of the component of FIGS. 3 and 4, FIG. 6 is a sectional plan view of a second embodiment of an automatic adjuster constructed in accordance with the invention, FIG. 7 is an end view of one component of a linear ratchet mechanism of the adjuster of, and FIG. 8 is a sectional elevation of a third embodiment of automatic adjuster constructed in accordance with the invention for a swinging caliper type disc brake.

Referring now to FIG. 1 of the drawings, a spot-type disc brake comprises a fixed body member 10 on which a yoke 11 is slideably mounted for movement transversely to the disc (not shown). Brake pads 12 and 13 are arranged to engage opposite sides of the disc. The body member has a through bore 14 in which opposed pistons 15 and 16 are slideable. The directly operated pad 12 is supported on and actuated by the piston 15 which incidentally is prevented by this pad from turning. The piston 16 engages and acts upon the yoke 11 and is prevented by the yoke from turning. The indirectly operated pad 13 is supported by the yoke.

An auxiliary mechanical actuator (e.g. a hand brake or other form of brake normally used for parking or emergencies) comprises a cam 17 journalled in a transverse bore 18 in the piston 16. The cam 17 acts on the piston 15 through an adjustable length ratchet mechanism 20 and a dolly 19. A laver 21a is attached to the cam 17 for turning this cam and an adjustable stop (not shown) is provided to determine the normal resting position of the cam 17.

The ratchet mechanism 20 comprises a pair of ratchet components 21 and 22 and a thrust member 23, a shank 42 of which is engaged by the dolly 19. The ratchet component 21 has a knurled head 24 which is force-fitted in the base of the hollow piston 15. The component 21 is shown to a larger scale in FIG. 2 and comprises a rod which has rows of ratchet teeth 25 over the major part of its periphery. The ratchet teeth are constituted by circumferentially extending serrations which are interrupted by longitudinal flutes 26 in the component 21. The component 22 which is shown in more detail in FIGS. 3 and 4 comprises a sleeve 27 formed with longitudinal slits 28 for most of its length to define four springy fingers 29. The free or distal ends of the fingers 29 are formed with serrations 30 complementary to the serrations 25 on the component 21. The fingers 29 thereby act as pawls biassed by their inherent resilience into engagement with the corresponding teeth 25 on the component 21. The form of the serrations 30 is shown in the very much enlarged detail of FIG. 5. As can be seen from this figure, the serrations have the form of a buttress thread on which the perpendicular flanks 31 serve to transmit thrust to a corresponding flank on the serrations on component 21. The opposed inclined flanks 32 allow the serrations to ride over one another when the mechanism is stepped to accomplish adjustment. Conveniently the serrations are formed in a fine-pitch spiral in the manner of a fine pitch screw thread to facilitate manufacture although there is in fact no screwing action in the adjuster to the present invention. Alternatively the serrations can be annular. The thrust member 23 is hollow and serves to house the ratchet component 22 as shown in FIG. 1. The thrust member 23 has an internal conical surface 34 which normally engages a complementary conical surface 35 (FIG. 4) adjacent the free ends of the fingers 29 of the component 22. Thus when the thrust member 23 applies a thrust through the ratchet teeth to the piston 15 this thrust is transmitted at these conical surfaces and the reaction at these surfaces has an inward force component acting on the fingers to urge these fingers more firmly and positively into engagement with the serrations on the component 21 so that the possibility of slipping of the ratchet mechanism is effectively avoided.

The thrust member 23 has an internal flange at its end remote from the cam 17 forming an abutment 36 for the component 22 and a predetermined clearance is normally present between this abutment and the component 22. A compression spring 37 acts between a spring ring 38 on the thrust member 23 and a cup member 39, sprung into a groove in the piston 16, to urge the member 23 against the cam 17 which is thereby held normally against the previously mentioned adjustable stop. An annular member 40 force-fitted into the piston 16 has a tongue 41 which engages in a groove in the member 23 to prevent this member from turning. The shank 42 of the member 23 is sealed to a bore in the piston 16 by a sealing ring 43. The pistons 15 and 16 are sealed to the bore 14 by sealing rings 44.

The ratchet mechanism 20 acts as a strut which limits the movement of the pistons 15 and 16 towards one another when the brake is in its release position. When the brake is applied by supplying brake fluid under pressure to the space between the pistons 15 and 16, these pistons are urged apart to apply the pads 12 and 13 to the disc. Normally the relative travel between the pistons 15 and 16 is less than the sum of the clearance between the component 22 and the abutment 36 and the pitch of the ratchet teeth so that no adjustment take place. If there should be excessive relative travel between the pistons due to pad wear, the component 21 is moved so far to the left relative to the component 22 that the ratchet mechanism is stepped to achieve automatic adjustment, i.e., the strut formed by the ratchet mechanism is slightly increased in length so that the pistons will not move so far towards one another when the brake pressure is released. When the auxiliary brake is applied, a brake-applying thrust is transmitted between the pistons through the ratchet mechanism by the cam 17. This causes the serrations 30 on fingers 29 to be urged positively against the serrations 25 on the rod 21 as previously described.

When it is desired to reset the adjuster upon replacement of worn pads by new pads, the piston 15 can be turned through 45° to disengage the serrations 25 on the rod 21 from the serrations 30 on the component 22. The piston 15 can then be pushed inwards to reduce the length of the ratchet mechanism to a minimum before a new pad 12 is fitted.

The embodiment of adjuster of FIGS. 6 and 7 is shown as applied to a similar hydraulic actuator to that shown in FIG. 1 and like parts are denoted by like reference numerals and will not be described again. The ratchet mechanism 50 of FIG. 6 comprises a component 51, cooperable with a row of ratchet teeth formed by serrations 52 in the inside surface of the hollow piston 15, and a thrust member 53 which is engaged by the dolly 19. The component 51 is shown in more detail in FIG. 7 and is in the form of a sleeve having broad longitudinal slits 54 to define two springy fingers 55. The fingers 55 have external serrations 56 which mate with the serrations 52 in the piston 15 and thereby act as a pair of pawls. The resilience of the fingers 55 biases the serrations 56 against the serrations 52. The thrust member 53 has an external conical surface 57 which engages a complementary internal conical surface 58 adjacent the ends of the fingers 55. Thus, when the member 53 transmits thrust to the fingers 55, the reaction at the surfaces 57 and 58 has an outward force component urging the serrations 56 on the fingers 55 more firmly and positively into engagement with the serrations 52. An abutment 59 for the component 51 and having a predetermined clearance therefrom is formed by a plate 60 which is secured to the thrust member 53 by a knurled stud 61 force-fitted in a bore in the end of the member 53. The plate 60 is located in grooves 64 in the end faces of the springy fingers 55 to prevent the sleeve 51 from turning relative to the member 53 and thereby relative to the piston 15. A compression spring 62 acts between a spring ring 63 on the thrust member 53 and a cup member 64a located on the piston 16 by a spring ring 65. The cup member 64a has a finger 66 engaging in a groove in the thrust member 53 and a finger 67 engaging in a hole in the piston 16 to prevent the member 53 from turning relative to this piston. The spring 62 urges the member 53 against the cam 17 and thereby urges the lever 21 against a stop 68. The automatic adjuster of FIGS. 6 and 7 acts in exactly the same manner as the adjuster of FIGS. 1 to 5. The principal difference between the two adjusters is that in FIG. 1 the pawls constituted by the fingers 29 are urged inwardly against ratchet teeth on the rod 21 by the thrust arising upon operation of the mechanical actuator whereas in FIG. 6 the springy fingers 55 are urged outwardly against ratchet teeth on the piston 15 itself.

Two diametrically opposed internal longitudinal flutes (not shown) are formed in the piston 15 so as to interrupt the circumferential extent of the serrations 52. When it is desired to reset the adjuster, e.g., on replacement of worn pads by new pads, the piston 15 can be turned through 90° to disengage the fingers 55 from the serrations and the piston 15 can then be pushed inwards to reduce the length of the ratchet mechanism to a minimum before a new pad 12 is fitted.

FIG. 8 shows an automatic adjuster constructed in accordance with the invention as applied to a swinging caliper type disc brake. The hydraulic actuator comprises a swinging body member 70 pivoted at 71 and supporting an indirectly operated pad 72. An annular piston 73 is slideable in a bore 74 in the body member 70 and acts against a directly operated pad 75. A cover 76 secured to the body member 70 closes the end of the bore 74. An auxiliary mechanical actuator comprises a cam 77 journalled in the cover 76 and acts through a dolly 78 and through a ratchet mechanism 79 on the piston 73. The cover 76 has a spigot 80 projecting inside the annular piston 73. Sealing rings 81 and 82 seal the annular piston 73 to the bore 74 and the spigot 80 respectively.

The ratchet mechanism 79 is essentially the same as the ratchet mechanism 20 of FIG. 1 and comprises a component 84 (corresponding to the component 21) secured to the piston 73, a component 85 (corresponding to the component 22) and a thrust member 86 (corresponding to the thrust member 23) acted upon by the dolly 78. The thrust member 86 is hollow and houses the component 85. The member 86 has an internal conical surface 87 cooperable with a complementary surface 88 on the ends of springy fingers acting as pawls and formed by a longitudinally slit sleeve which constitutes the component 85. The member 86 also has an internal flange forming an abutment 89 for the component 85.

A compression spring 90 acts between a spring ring 91 on the member 86 and a spring ring 92 inside the spigot 80 to urge the member 86 against the cam 77 and thereby the cam against its stop (not shown).

The automatic adjuster of FIG. 8 operates in essentially the same manner as that of FIG. 1. One main difference is that the adjuster is not immersed in the brake fluid as the brake fluid is applied to an annular chamber 92 around the outside of the spigot 80. Another difference is that the cam 77 is journalled in the cover 76 which is effectively part of the body member 70 rather than in a piston opposed to the piston 73.

We claim:
1. In a hydraulic actuator for a vehicle brake including a piston, a counter-member opposed to said piston, a working chamber between said piston and said counter- member for receiving brake fluid under pressure to move said piston and counter-member apart when the brake is applied hydraulically and an auxiliary mechanical actuator fitted in said counter-member for mechanically moving said piston and counter-member apart; an automatic adjuster operative between said piston and said auxiliary mechanical actuator and comprising:

(a) a linear ratchet member having at least one row of ratchet teeth thereon, (b) a pawl having a free end engageable with said ratchet teeth; said pawl having on said free end thereof an inclined surface at the side of said pawl remote from said ratchet teeth, (c) a thrust member axially displaceable relative to said ratchet member and having thereon an inclined surface engageable with said inclined surface on said pawl, the direction of inclination of said inclined surfaces being such that axial thrust transmitted between said thrust member and said ratchet member via said pawl by operation of said auxiliary mechanical actuator develops a radial component of thrust at said inclined surfaces, said radial component urging said end of said pawl positively into engagement with said ratchet teeth, and (d) means responsive to relative travel between said piston and said counter-member in excess of a predetermined relative travel for stepping said pawl along said ratchet teeth.

2. An automatic adjuster as claimed in claim 1 in which said pawl is comprised by a springy finger forming an internal part of an axially moveable member, said one end of said pawl engageable with said row of ratchet teeth and having said inclined surface thereon being the distil end of said springy finger.

3. An automatic adjuster as claimed in claim 1 in which said row of ratchet teeth is comprised by a row of circumferentially extending serrations and said adjuster includes several pawls, said pawls being in the form of springy fingers comprised by a longitudinally slit, axially movable sleeve, the distil ends of said fingers being engageable with said serrations and having inclined surfaces thereon engageable by said inclined surface of said thrust member.

4. An automatic adjuster as claimed in claim 3 in which said distil end of each said finger has several circumferentially extending serrations thereon complementary to said serrations comprising said row of ratchet teeth.

5. An automatic adjuster as claimed in claim 3 in which said circumferentially extending serrations comprise a fine-pitch buttress-type screw-thread.

6. An automatic adjuster as claimed in claim 3 in which said serrations comprising said row of ratchet teeth are circumferentially interrupted at longitudinally aligned locations so that, by angularly displacing said longitudinally slit sleeve relative to said row of ratchet teeth, said pawls can be disengaged for resetting said adjuster.

7. An automatic adjuster as claimed in claim 3 in which said piston has a rod extending therefrom inside said sleeve and having thereon said circumferentially extending serrations comprising said row of ratchet teeth and in which said thrust member is hollow and said inclined surface thereon comprises an internal conical surface thereon, by which said thrust member normally engages said inclined surfaces on said distal ends of said fingers for inwardly urging the fingers positively into engagement with said serrations.

8. An automatic adjuster as claimed in claim 3 in which said piston is hollow and has said circumferentially extending serrations comprising said row of ratchet teeth formed on the internal surface thereof and in which said thrust member comprises a rod extending within said longitudinally slit sleeve and said inclined surface on said thrust member is an external conical surface on said rod by which said thrust member normally engages said inclined surfaces on said distal ends of said fingers for outwardly urging the fingers positively into engagement with said serrations.

9. An automatic adjuster as claimed in claim 1 in which said means for stepping said pawl along said ratchet teeth comprises an abutment disposed on said thrust member to abut said pawl and advance said pawl along said row of ratchet teeth when said excessive travel takes place between said piston and said counter-member.

10. An automatic adjuster as claimed in claim 9 which further comprises a spring acting on said thrust member in a direction towards said auxiliary mechanical actuator.

11. An automatic adjuster as claimed in claim 1 in which said auxiliary mechanical actuator comprises a cam journalled in said counter-member.

12. An automatic adjuster as claimed in claim 11 in which said cam is journalled about an axis perpendicular to the longitudinal axis of said hydraulic actuator.

13. An automatic adjuster as claimed in claim 1 in which said hydraulic actuator includes a body member having a through bore and said counter-member of the hydraulic actuator comprises a second piston opposed to the first-mentioned piston both said pistons being slidable in said bore through said body member.

14. An automatic adjuster as claimed in claim 1 in which said counter-member of said hydraulic actuator comprises a body member having a cylinder therein in which said piston is slidable.

References Cited

UNITED STATES PATENTS 3,335,819   8/1967   Swift.
3,365,029   1/1968   Swift.

DUANE A. REGER, Primary Examiner

U.S. Cl. X.R.

188—73, 196